(12) United States Patent
Itou (10) Patent No.: US 8,435,598 B2
(45) Date of Patent: May 7, 2013

(54) METHOD OF PRODUCING A RETARDATION PLATE, RETARDATION PLATE, POLARIZING PLATE WITH A RETARDATION PLATE, LIQUID CRYSTAL PANEL, AND LIQUID CRYSTAL DISPLAY APPARATUS

(75) Inventor: Kanako Itou, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 754 days.

(21) Appl. No.: 12/159,898

(22) PCT Filed: Jan. 15, 2007

(86) PCT No.: PCT/JP2007/050387
§ 371 (c)(1),
(2), (4) Date: Jul. 2, 2008

(87) PCT Pub. No.: WO2007/086265
PCT Pub. Date: Aug. 2, 2007

(65) Prior Publication Data
US 2009/0290103 A1 Nov. 26, 2009

(30) Foreign Application Priority Data
Jan. 30, 2006 (JP) .................................. 2006-020885

(51) Int. Cl.
*B05D 5/06* (2006.01)
*B05D 3/02* (2006.01)
*B05D 3/00* (2006.01)

(52) U.S. Cl.
USPC ...................... 427/164; 427/372.2; 427/385.5

(58) Field of Classification Search .................. 427/162, 427/372.2, 394, 385.5, 399, 400, 163.1, 164, 427/393.5; 264/1.31; 349/96; 428/1.1
See application file for complete search history.

(56) References Cited

U.S. PATENT DOCUMENTS

| 6,342,936 B1 * | 1/2002 | Murayama et al. ........... 349/141 |
| 7,428,029 B2 | 9/2008 | Murakami et al. |
| 2002/0005925 A1 * | 1/2002 | Arakawa ....................... 349/117 |
| 2006/0055853 A1 | 3/2006 | Murakami et al. |

FOREIGN PATENT DOCUMENTS

| EP | 0488369 A2 | 6/1992 |
| JP | 4-204503 A | 7/1992 |
| JP | 04-343303 A | 11/1992 |
| JP | 5-113506 A | 5/1993 |

(Continued)

OTHER PUBLICATIONS

International Search Report of PCT/JP2007/050387; date of mail Apr. 3, 2007.
Taiwanese Office Action dated Apr. 29, 2011, issued in corresponding Taiwanese Patent Application No. 096103174.
Japanese Office Action dated Dec. 19, 2012 (mailing date), issued in corresponding Japanese Patent Application No. 2010-109229 (6 pages) with English translation.

*Primary Examiner* — Dah-Wei Yuan
*Assistant Examiner* — Nga Leung V Law
(74) *Attorney, Agent, or Firm* — Westerman, Hattori, Daniels & Adrian, LLP (57) ABSTRACT

A method of producing a retardation plate includes the steps of applying a solution containing a resin B and a solvent to an optical base material containing a resin A to obtain a laminate including an optical base material layer and an application layer, and stretching the laminate, in which one of the resin A and the resin B has positive alignment birefringence, and another one of the resin A and the resin B has negative alignment birefringence, and the stretching is performed by setting an amount of a residual solvent in the laminate to be 2 to 10% by weight.

11 Claims, 2 Drawing Sheets

FOREIGN PATENT DOCUMENTS

| | | | |
|---|---|---|---|
| JP | 05113506 A * | 5/1993 |
| JP | 2002-107542 A | 4/2002 |
| JP | 2003-195038 A | 7/2003 |
| JP | 2004-133209 A | 4/2004 |
| JP | 2004-195875 A | 7/2004 |
| JP | 2004-325971 A | 11/2004 |
| JP | 2005-284024 A | 10/2005 |
| JP | 2005-331597 A | 12/2005 |
| JP | 2006-003640 A | 1/2006 |
| JP | 2006-003883 A | 1/2006 |
| TW | 200404842 A | 4/2004 |

* cited by examiner

METHOD OF PRODUCING A RETARDATION PLATE, RETARDATION PLATE, POLARIZING PLATE WITH A RETARDATION PLATE, LIQUID CRYSTAL PANEL, AND LIQUID CRYSTAL DISPLAY APPARATUS

BACKGROUND OF THE INVENTION

1. Technical Field

The present invention relates to a method of producing a retardation plate. The present invention also relates to a retardation plate obtained by the production method, a polarizing plate with a retardation plate including the retardation plate, a liquid crystal panel including the retardation plate, and a liquid crystal display apparatus including the liquid crystal panel.

2. Background Art

A liquid crystal display apparatus, etc. involve such a problem that a display screen is colored due to a retardation caused by a liquid crystal cell. In order to solve the problem, a retardation plate is used. The retardation plate is generally used while being attached to a polarizing plate.

A retardation plate to be used in a liquid crystal display apparatus, etc. desirably exhibits its function sufficiently with respect to incident light in the entire visible light region. In particular, the retardation plate desirably has so-called reverse dispersion characteristics in which an in-plane direction retardation increases with an increase in a wavelength. As a retardation plate having reverse dispersion characteristics, a laminated retardation plate in which retardation plates having different wavelength dispersion characteristics are laminated so that slow axes are perpendicular to each other (for example, see Patent Document 1).

In the laminated retardation plate, retardation plates to be laminated are attached to each other with a pressure-sensitive adhesive. Therefore, optical properties may decrease due to the presence of a pressure-sensitive adhesive layer. Further, when the retardation plates are attached to each other with a pressures-sensitive adhesive, an axis shift of the retardation plates to be laminated occurs, with the result that retardation plates having reverse dispersion characteristics may not be obtained.

In order to prevent the axis shift of a laminated retardation plate, a method of producing a laminated retardation plate having reverse dispersion characteristics by co-extruding melt of a resin having positive alignment birefringence and melt of a resin having negative alignment birefringence to form a laminate, and stretching the laminate in the same direction (for example, see Patent Document 2).

In the case of producing a laminated retardation plate by the co-extrusion and stretching, respective layers are stretched simultaneously in a uniaxial direction to express a retardation. Generally, in order to express a retardation, stretching is performed in the vicinity of a glass transition temperature (Tg) of a resin contained in each layer. In the case where Tg's of resins of the layers greatly differs from each other, a retardation is difficult to be expressed when the stretching temperature is adjusted to a higher Tg, and retardation unevenness occurs when the stretching temperature is adjusted to a lower Tg. In such cases, it is difficult to set an appropriate stretching temperature, and it is necessary to limit a combination of resins to be used so that the difference in glass transition temperature (Tg) of the resins contained in the respective layers is small.

In the case where the thickness of a laminate increases so as to express a desired retardation, it is necessary to increase a stretching temperature so as to stretch the laminate uniformly. Even in such a case, there arises problems that a retardation is not expressed and retardation unevenness occurs.

Patent Document 1: JP 04-343303 A
Patent Document 2: JP 2002-107542 A

BRIEF SUMMARY OF THE INVENTION

Problems to be Solved by the Invention

It is an object of the present invention to provide a method capable of setting an appropriate stretching temperature even in the case where the difference in Tg of resins contained in respective layers is large and the case where the thickness of a laminate is large when a retardation plate having reverse dispersion characteristics is produced by stretching a laminate, and capable of obtaining a retardation plate which can express a sufficient retardation and in which retardation unevenness is reduced. It is also an object of the present invention to provide a retardation plate obtained by such a method, a polarizing plate with a retardation plate and a liquid crystal panel including the retardation plate, and a liquid crystal display apparatus including the liquid crystal panel.

Means for Solving the Problems

A method of producing a retardation plate according to the present invention includes the steps of applying a solution containing a resin B and a solvent to an optical base material containing a resin A to obtain a laminate including an optical base material layer and an application layer; and stretching the laminate, in which: one of the resin A and the resin B has positive alignment birefringence, and another one of the resin A and the resin B has negative alignment birefringence; and the stretching is performed by setting an amount of a residual solvent in the laminate to be 2 to 10% by weight.

In a preferred embodiment, a glass transition temperature Tg(B) of the resin B is higher than a glass transition temperature Tg(A) of the resin A.

In a preferred embodiment, the stretching temperature of the laminate is lower than the glass transition temperature Tg(A) of the resin A.

In a preferred embodiment, the resin having positive alignment birefringence is a norbornene-based resin.

In a preferred embodiment, the resin having negative alignment birefringence is a styrene-maleic anhydride copolymer.

According to another aspect of the present invention, a retardation plate is provided. The retardation plate of the present invention is obtained by the production method of the present invention.

According to another aspect of the present invention, a polarizing plate with a retardation plate is provided. The polarizing plate with a retardation plate of the present invention includes the retardation plate of the present invention and a polarizing plate.

According to another aspect of the present invention, a liquid crystal panel is provided. The liquid crystal panel of the present invention includes the retardation plate of the present invention.

According to another aspect of the present invention, a liquid crystal display apparatus is provided. The liquid crystal display apparatus of the present invention includes the liquid crystal panel of the present invention.

EFFECTS OF THE INVENTION

According to the present invention, an appropriate stretching temperature can be set even in the case where the difference in Tg of resins contained in respective layers is large and the case where the thickness of a laminate is large when a retardation plate having reverse dispersion characteristics is produced by stretching a laminate, and a retardation plate which can express a sufficient retardation and in which retardation unevenness is reduced can be obtained. Further, a polarizing plate with a retardation plate, a liquid crystal panel, and a liquid crystal display apparatus using the retardation plate obtained by such a method can express excellent optical properties.

Those effects can be expressed by producing a retardation plate having reverse dispersion characteristics by applying a solution containing one of resins having positive or negative alignment birefringence to an optical base material containing the other of the resins to prepare a laminate, and by stretching the laminate under particular conditions.

DESCRIPTION OF REFERENCE NUMERALS

| | |
|---|---|
| 10 | liquid crystal cell |
| 11 | substrate |
| 11' | substrate |
| 12 | liquid crystal layer |
| 13 | spacer |
| 20 | first polarizer |
| 20' | second polarizer |
| 30 | retardation plate |
| 40 | retardation plate |
| 50 | polarizing plate |
| 50' | polarizing plate |
| 60 | light guide plate |
| 70 | light source |
| 80 | reflector |
| 100 | liquid crystal panel |
| 1000 | liquid crystal display apparatus |

DETAILED DESCRIPTION OF THE INVENTION (Definitions of Terms and Symbols)

Definitions of terms and symbols in the specification of the present invention are described below.

(1) The symbol "nx" refers to a refractive index in a direction providing a maximum in-plane refractive index (that is, a slow axis direction), the symbol "ny" refers to a refractive index in a direction perpendicular to the slow axis in the plane (that is, a fast axis direction), and the symbol "nz" refers to a refractive index in a thickness direction. Further, the expression "nx=ny", for example, not only refers to a case where nx and ny are exactly equal but also includes a case where nx and ny are substantially equal. In the specification of the present invention, the phrase "substantially equal" includes a case where nx and ny differ within a range providing no effects on overall optical properties of an optical film (retardation plate and the like) in practical use.

(2) The term "in-plane retardation Re($\lambda$)" refers to an in-plane retardation value of a film (layer) measured at 23° C. by using a light having a wavelength of $\lambda$ nm. Re($\lambda$) can be determined from an equation Re($\lambda$)=(nx−ny)×d, where nx and ny represent refractive indices of a film (layer) at a wavelength of $\lambda$ nm in a slow axis direction and a fast axis direction, respectively, and d (nm) represents a thickness of the film (layer). For example, Re(480), Re(590), and Re(750) represent in-plane retardations at wavelengths of 480 nm, 590 nm, and 750 nm, respectively.

[Method of Producing a Retardation Plate]

A method of producing a retardation plate of the present invention includes a step of applying a solution containing a resin B and a solvent to an optical base material containing a resin A to obtain a laminate including an optical base material layer and an application layer, and the step of stretching the laminate, in which one of the resin A and the resin B has positive alignment birefringence, the other has negative alignment birefringence, and the stretching is performed by setting the amount of a residual solvent in the laminate to be 2 to 10% by weight. Hereinafter, the production method of the present invention will be described in detail.

(Resin Having Positive Alignment Birefringence)

In the present invention, the resin having positive alignment birefringence refers to a resin in which a refractive index in a stretching direction becomes maximum when a layer formed of the resin is stretched. Examples of the resin having positive alignment birefringence include a norbornene-based resin, an acetate-based resin, a polyester-based resin, a polyethersulfon-based resin, a polycarbonate-based resin, a polyamide-based resin, a polyimide-based resin, a polyolefin-based resin, polyethylene oxide, and polyphenylene ether. In order to enhance the thermal resistance and mechanical strength of a film, those including an alkene unit, a substituted or un-substituted maleimide unit, a vinyl-based unit, or the like may be used. Specific examples thereof include an olefin maleimide copolymer. As a resin having positive alignment birefringence used in the present invention, a norbornene-based resin is particularly preferred.

(Resin Having Negative Alignment Birefringence)

In the present invention, the resin having negative alignment birefringence refers to a resin in which a refractive index in a direction perpendicular to a stretching direction becomes maximum when a layer formed of the resin is stretched. Examples of the resin having negative alignment birefringence include: a single monomer based resin such as polystyrene, an acrylic homopolymer, a methacylic homopolymer, an acrylate-based homopolymer, and a methacrylate-based homopolymer; and a copolymer of the single monomer and another monomer that enhances mechanical properties and the like. Specific examples thereof include a styrene-maleic anhydride copolymer, a styrene-maleimide copolymer, a copolymer including an olefin-based unit and an acrylic unit, and a copolymer including a nitrile-based unit and a styrene-based unit. Examples of the styrene-based compound constituting a styrene-based unit include an unsubstituted or substituted styrene-based compound such as styrene, vinyltoluene, methoxystyrene or chlorostyrene, and α-methylstynrene. Examples of the nitrile-based compound constituting a nitrile-based unit include α-substituted unsaturated nitrile such as acrylonitrile and methacrylonitrile, and those having an α,β-di-substituted olefinic unsaturated bond such as fumaronitrile. As the resin having negative alignment birefringence used in the present invention, in particular, a styrene-maleic anhydride copolymer is preferred.

(Optical Base Material)

In the present invention, the optical base material contains a resin A. As the resin A, the resin having positive alignment birefringence or resin having negative alignment birefringence is used. A method of producing an optical base material is not particularly limited. For example, the resin A can be formed as an unstretched film or sheet, using any suitable forming method. Examples of the forming method include extrusion molding, calendar forming, solvent casting, and film casting.

(Laminate)

In the present invention, a laminate (laminate before being stretched) including an optical base material layer and an application layer is obtained by applying a solution containing a resin B and a solvent to an optical base material containing the resin A. As the resin B, the resin having positive alignment birefringence or the resin having negative alignment birefringence is used. In the case where the resin A is the resin having positive alignment birefringence, the resin B is a resin having negative alignment birefringence, and in the case where the resin A is a resin having negative alignment birefringence, the resin B is a resin having positive alignment birefringence.

Any suitable solvent may be used as the solvent without being particularly limited. For example, any solvent which can dissolve resin B may be appropriately decided in accordance with the type of resin B. Specific examples include: halogenated hydrocarbons such as chloroform, dichloromethane, carbon tetrachloride, dichloroethane, tetrachloroethane, trichloroethylene, tetrachloroethylene, chlorobenzene, and orthodichlorobenzene; phenols such as phenol and parachlorophenol; aromatic hydrocarbons such as benzene, toluene, xylene, methoxybenzene, and 1,2-dimethoxybenzene; ketone-based solvents such as acetone, methyl ethyl ketone, methyl isobutyl ketone, cyclohexanone, cyclopentanone, 2-pyrrolidone, and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amide-based solvents such as dimethylformamide and dimethylacetamide; nitrile-based solvents such as acetonitrile and butyronitrole; ether-based solvents such as diethyl ether, dibutyl ether, and tetrahydrofuran; carbon disulfide; and cellosolve-based solvents such as ethyl cellosolve and butyl cellosolve. The solvents may be used alone or in combination.

The application layer is obtained by applying a solution containing the resin B and the solvent to the optical base material. The solution (application solution) contains the resin B and the solvent, and may contain any other suitable components as long as the effects of the present invention are not impaired. Examples of the other components include various additives such as a stabilizer, metals, and a compatibilizer.

The concentration of the solution is not particularly limited, and can be adjusted to any suitable concentration as long as the effects of the present invention are not impaired. For example, the concentration of the resin B is preferably 0.5 to 50 parts by weight, more preferably 1 to 40 parts by weight, and still more preferably 2 to 35 parts by weight with respect to 100 parts by weight of a solvent, because the viscosity at which the application becomes easy is obtained. It is preferred that the concentration of the resin B be 0.5 parts by weight or more with respect to 100 parts by weight of a solvent, because the viscosity suitable for application can be obtained. Further, it is preferred that the concentration of the resin B be 50 parts by weight or less with respect to 100 parts by weight of a solvent, because the viscosity at which a smooth applied surface can be formed is obtained.

Any suitable application method can be adopted as the application method without being particularly limited. For example, spin coating, roll coating, flow coating, die coating, blade coating, printing, dip coating, casting deposition, bar coating, and gravure printing are mentioned.

The laminate includes a laminate structure obtained by applying a solution containing the resin B and the solvent to an optical base material containing the resin A, i.e., a laminate structure including an optical base material layer and an application layer. The laminate may include two layers of an optical base material layer and an application layer, and may further include one layer or two or more layers of other optical layers. That is, the number of the lamination of the laminate is not particularly limited as long as it is two or more.

The thickness of the laminate is not particularly limited, and adjusted in accordance with a desired retardation. Further, the thicknesses of the optical base material layer and the application layer are not particularly limited, and adjusted in accordance with a desired retardation and reverse dispersion characteristics. In order to express a retardation exactly by setting an appropriate stretching temperature, it is preferred to set the thickness of the application layer to be equal to or smaller than that of the optical base material layer.

(Adjustment of the Amount of a Residual Solvent of a Laminate)

The method of producing a retardation plate of the present invention includes the step of stretching the laminate. In the present invention, the laminate is stretched after the amount of a residual solvent in the laminate (laminate before being stretched) is adjusted to 2 to 10% by weight. When the laminate is stretched after the amount of a residual solvent is adjusted to this range, the stretching temperature can be decreased after a desired retardation is expressed, compared with the case where the laminate (before being stretched) contains little residual solvent. This is presumed that the solvent functions as a plasticizer due to the presence of a residual solvent in the laminate during stretching, which decreases the entire stretching temperature.

The amount of a residual solvent in the laminate (before being stretched) is preferably 2 to 9% by weight, and more preferably 3 to 8% by weight. When the amount of a residual solvent is less than 2% by weight, the stretching temperature may not be decreased. Further, in the case where a laminate is composed of a combination of layers having Tg's of large differences and in the case where the thickness of the laminate is large, a desired retardation may not be expressed by stretching. When the amount of a residual solvent exceeds 10% by weight, wrinkles are formed in the laminate during stretching, which may make it impossible to produce an appropriate retardation plate.

The optical base material layer in the laminate (before being stretched) preferably contains no residual solvent, and if a residual solvent is contained therein, it is preferably in an amount of 0.5% by weight or less and more preferably in an amount of 0.3% by weight or less with respect to the optical base material layer (optical base material). In the case where a solvent remains in the optical base material layer, a resin is not aligned even if the laminate is stretched due to the presence of the residual solvent in combination with the impregnation with a solvent from an application layer, and a retardation may not be expressed. In particular, when a large amount of solvent is contained in a layer having a resin with a lower Tg, a retardation may not be expressed.

In the present invention, an application layer is provided on an optical base material to make it unnecessary to provide a support, which can also make it unnecessary to set peeling and the like from the support.

The amount of a residual solvent is represented by the following expression. X represents the weight of a laminate immediately before being stretched, and Y represents the weight of a laminate immediately before being stretched and after being heated at 150° C. for 30 minutes.

$$\text{Amount of a residual solvent(\% by weight)} = [(X-Y)/X] \times 100$$

As a method of adjusting the amount of a residual solvent in the laminate (before being stretched), any suitable method can be adopted without any particular limit. Examples thereof include a method of sending hot air to a laminate, and a method of allowing a laminate to pass through a dry chamber heated to a predetermined temperature for a predetermined period of time. The specific conditions for adjusting the amount of a residual solvent in a laminate (before being stretched) are appropriately set depending upon the thickness of a laminate, the kind of a solvent, and the like.

(Stretching of a Laminate)

In the present invention, as described above, a laminate is stretched after the amount of a residual solvent in the laminate (before being stretched) is adjusted to 2 to 10% by weight. As the stretching method, any suitable stretching method can be adopted. Examples thereof include longitudinal uniaxial stretching for stretching a laminate in the same direction as that of transporting the laminate, and lateral uniaxial stretching (tenter stretching) for stretching a laminate in a direction perpendicular to that of transporting the laminate. It is also possible to provide biaxiality by biaxial stretching so as to control a thickness direction.

The stretching ratio may be appropriately set depending upon a desired retardation value and the thickness of a laminate. The stretching ratio is preferably 1.1 to 3.0 times, and more preferably 1.2 to 2.8 times.

The stretching temperature can be appropriately determined depending upon a glass transition temperature $Tg(A)$ of the resin A, a glass transition temperature $Tg(B)$ of the resin B, and the amount of a residual solvent of a laminate during stretching. Usually, the stretching temperature for expressing a retardation is in the vicinity of the glass transition temperature (Tg) of a material resin to be stretched, and in the case of a laminate, the difference in Tg of the resins constituting respective layers is generally minimized as far as possible. In the case where the Tg's of the resins of the respective layers are different from each other to a large extent, a retardation is difficult to be expressed when the stretching temperature is adjusted to a higher Tg, and retardation unevenness occurs when the stretching temperature is adjusted to a lower Tg. In such a case, there arise problems that it becomes difficult to set an appropriate stretching temperature, and it is necessary to limit a combination of resins to be used so that the difference in glass transition temperature (Tg) of the resins contained in the respective layers becomes small. According to the method of producing a retardation plate of the present invention, even in the case where the difference in Tg of the resins contained in the respective layers is large, it is possible to set an appropriate stretching temperature (for example, a low stretching temperature) after allowing a desired retardation to be expressed. For example, even in the case where the difference in Tg of the resins contained in the respective layers is larger than 10° C., e.g., 15 to 40° C., it is possible to produce a retardation plate by decreasing a stretching temperature after allowing a desired retardation to be expressed. Further, even in the case where the difference in Tg of the resins contained in the respective layers is zero or small, it is possible to produce a retardation plate by the production method of the present invention. Particularly, in the case where it is desired to decrease the stretching temperature for the purpose of saving energy and the like, the production method of the present invention is preferred.

In the case where the thickness of a laminate is increased in order to express a desired retardation, it has been necessary to increase a stretching temperature so as to stretch the laminate uniformly according to a conventional production method. Consequently, there arise problems that a retardation is not expressed and retardation unevenness occurs. According to the present invention, it is possible to set an appropriate stretching temperature (for example, a low stretching temperature) after allowing a desired retardation to be expressed. The case where the thickness of a laminate increases refers to, for example, the case where the thickness becomes 150 μm or more, although not limited uniquely depending upon the kind of resins. Even in the case where the thickness of a laminate is less than 150 μm, it is possible to produce a retardation plate by the production method of the present invention, and the production method of the present invention is preferred in the case where it is desired to decrease the stretching temperature for the purpose of saving energy and the like.

According to the present invention, in order to decrease the stretching temperature more effectively, it is preferred to set the glass transition temperature $Tg(B)$ of the resin B contained in the application layer to be higher than the glass transition temperature $Tg(A)$ of the resin A contained in the optical base material layer. More specifically, it is preferred that a relationship of $Tg(A)<Tg(B)$ be satisfied. This is because the resin having a higher Tg is contained in the application layer, and a residual solvent is present in the application layer, whereby the stretching temperature can be decreased more effectively. In contrast, when the resin having a lower Tg is contained in the application layer, it may be difficult for a retardation to be expressed.

In the present invention, in order to express a desired retardation, it is preferred to set the stretching temperature to be lower than the glass transition temperature $Tg(A)$ of the resin A contained in the optical base material layer. More specifically, it is preferred that a relationship of $T<Tg(A)$ be satisfied, where T represents a stretching temperature.

In order to express the effects of the present invention most satisfactorily, it is preferred that a relationship of $T<Tg(A)<Tg(B)$ be satisfied.

[Retardation Plate]

In the present invention, a laminate including the optical base material layer containing the resin A and the application layer containing the resin B are stretched simultaneously in the same direction under the above conditions, whereby the retardation plate of the present invention is produced. Thus, the slow axis (in which a refractive index becomes maximum) of the layer containing a resin having positive alignment birefringence is expressed in the same direction as the stretching direction, and a slow axis of a layer containing a resin having negative alignment birefringence is expressed in a direction perpendicular to the stretching direction. Consequently, the layers are laminated so that the slow axes are perpendicular to each other, and in-plane direction retardations of the respective layers cancel each other. Therefore, a retardation plate having reverse dispersion characteristics can be produced preferably. Further, it is not necessary to attach the layers with a pressure-sensitive adhesive, so optical properties may not be degraded, and an axis shift may not occur.

The retardation plate having reverse dispersion characteristics preferably has characteristics in which an in-plane retardation (Re) increases with an increase in wavelength, particularly in an wavelength range of 400 to 750 nm of a visible light region. For example, in the case where in-plane retardations at wavelengths of 480 nm, 590 nm, and 750 nm are Re(480), Re(590), and Re(750), such a retardation plate has a relationship of $Re(480)<Re(590)<Re(750)$.

In order to produce a retardation plate having reverse dispersion characteristics, a combination of a resin having large wavelength dispersion characteristics (positive dispersion, and a slope thereof is steep) and a resin having small wavelength dispersion characteristics (positive dispersion, and a slope thereof is gentle), and further, it is preferred to laminate layers in such a manner that the thickness of the resin layer having small wavelength dispersion characteristics is smaller than that of the resin layer having large wavelength dispersion characteristics. Regarding the respective characteristics of reverse dispersion, an appropriate material can be used depending upon desired reverse dispersion characteristics.

The thickness of the retardation plate produced by stretching is not particularly limited, and is set appropriately depending upon a desired retardation value. The thickness is preferably 10 μm to 200 μm, more preferably 20 to 150 μm, and still more preferably 30 to 100 μm.

Considering the post-processing such as wind-up and the optical properties to be expressed, the amount of a residual solvent immediately after stretching of the retardation plate produced by stretching is preferably 3.0% by weight or less, more preferably 2.0% by weight or less, still more preferably 1.0% by weight or less, and particularly preferably 0.5% by weight or less. The lower limit is preferably as low as possible, and most preferably substantially 0% by weight.

[Polarizing Plate with a Retardation Plate]

(Polarizer)

Any appropriate polarizer may be employed as the polarizer that can be used for the polarizing plate with a retardation plate of the present invention in accordance with the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, a partially saponified ethylene/vinyl acetate copolymer-based film, or a cellulose-based film, and then uniaxially being stretched; and a polyene-based aligned film such as a dehydrated product of a polyvinyl alcohol or a dehydrochlorinated product of a polyvinyl chloride. Of those, a polarizer prepared by adsorbing a dichromatic substance such as iodine on a polyvinyl alcohol-based film and uniaxially being stretched is particularly preferable because of high-polarized dichromaticity. A thickness of the polarizer is not particularly limited, but is generally about 1 to 80 μm.

The polarizer prepared by adsorbing iodine on a polyvinyl alcohol-based film and uniaxially being stretched may be produced by, for example: immersing a polyvinyl alcohol-based film in an aqueous solution of iodine for coloring; and stretching the film to 3 to 7 times the length of the original length. The aqueous solution may contain boric acid, zinc sulfate, zinc chloride, or the like as required, or the polyvinyl alcohol-based film may be immersed in an aqueous solution of potassium iodide or the like. By washing the polyvinyl alcohol-based film with water, contamination on a surface thereof and an antiblocking agent can be washed off. Further, by washing the polyvinyl alcohol-based film with water, swelling of the polyvinyl alcohol-based film and preventing nonuniformity such as uneven coloring becomes possible. The stretching of the film may be performed after coloring of the film with iodine, may be performed during coloring of the film, or may be performed followed by coloring of the film with iodine. The stretching may be performed in an aqueous solution of boric acid or potassium iodide, or in a water bath.

(Protective Layer)

It is preferred that the protective layer that can be used for the polarizing plate with a retardation plate of the present invention be transparent and colorless.

The thickness of the protective layer can be set appropriately depending upon the purpose. Specifically, the thickness is preferably 20 to 140 μm, more preferably 40 to 120 μm, and still more preferably 60 to 100 μm.

Any appropriate material may be employed as the material for constituting the protective layer. As an example of the material, a plastic film having excellent transparency, mechanical strength, thermal stability, water blocking property, anisotropy, and the like, for example, is mentioned. Specific examples of the resin constituting the plastic film include an acetate resin such as triacetylcellulose (TAC), a polyester resin, a polyether sulfone resin, a polysulfone resin, a polycarbonate resin, a polyamide resin, a polyimide resin, a polyolefin resin, an acrylic resin, a polynorbornene resin, a cellulose resin, a polyarylate resin, a polystyrene resin, a polyvinyl alcohol resin, a polyacrylic resin, and a mixture thereof. Further, an acrylic-based, urethane-based, acrylic urethane-based, epoxy-based, or silicone-based thermosetting resin or UV-curing resin may also be used. Of those, a TAC film subjected to surface saponification treatment with alkali or the like is preferable from the viewpoints of polarization properties and durability.

Further, a polymer film formed of a resin composition described in JP 2001-343529 A (WO 01/37007), for example, may be used as a protective layer. Specifically, the film is formed of a mixture of a thermoplastic resin having a substituted imide group or unsubstituted imide group on a side chain, and a thermoplastic resin having a substituted phenyl group or unsubstituted phenyl group and a cyano group on a side chain. A specific example thereof includes a resin composition containing an alternate copolymer of isobutene and N-methylene maleimide, and an acrylonitrile-styrene copolymer. An extruded product of such a resin composition may be used, for example.

The protective layer may be subjected to, for example, hard coat treatment, reflection preventing treatment, treatment for the purposes of sticking prevention, dispersion and antiglare. The hard coat treatment is performed for the purpose of preventing damage of the surface of a polarizing plate, and for example, is a treatment for forming a cured coating film excellent in hardness and sliding property, formed of a curable resin, on the surface of the protective layer. As the curable resin, for example, silicone-based, urethane-based, acrylic, and epoxy-based UV-curable resin and the like can be used, and the treatment can be performed by a conventional known method. The sticking prevention is performed for the purpose of preventing the close adhesion between adjacent layers. The reflection prevention treatment is performed for the purpose of preventing the reflection of ambient light on the surface of the polarizing plate, and can be performed by forming a conventionally known reflection preventing layer and the like.

(Polarizing Plate)

The basic configuration of the polarizing plate that can be used for the polarizing plate with a retardation plate of the present invention is not particularly limited, but it is preferred that the protective layers be laminated on both sides of the polarizer. The protective layers laminated on both sides of the polarizer may be the same as or different from each other.

As a method of laminating the polarizer and the protective layer, any suitable lamination method (for example, bonding) can be adopted. The bonding can be performed using any suitable adhesive or pressure-sensitive adhesive. The kind of the adhesive or the pressure-sensitive adhesive can be selected appropriately depending upon the kind of an adherend (i.e., a polarizer and a protective layer). Specific examples of the adhesive include acrylic, vinyl alcohol-based, silicone-based, polyester-based, polyurethane-based, or polyether-based polymer adhesive, an isocyanate-based adhesive, and a rubber-based adhesive. Specific examples of the pressure-sensitive adhesive include an acrylic, vinyl alcohol-based, silicone-based, polyester-based, polyurethane-based, polyether-based, isocyanate-based, or rubber-based pressure-sensitive adhesive. The thickness of the adhesive or pressure-sensitive adhesive is not particularly limited, but it is preferably 10 to 200 nm, more preferably 30 to 180 nm, and most preferably 50 to 150 nm.

The polarizing plate that can be used for the polarizing plate with a retardation plate of the present invention can be provided with still another optical layer. As another optical layer, any suitable optical layer can be adopted depending upon the purpose and the kind of an image display apparatus. Specific examples thereof include a liquid crystal film, a light scattering film, a diffraction film, and still another optical compensation layer (retardation film).

(Polarizing Plate with a Retardation Plate)

The polarizing plate of the present invention can be used for various kinds of optical applications, specifically, as optical compensation members of various kinds of liquid crystal display elements, as a single film or a laminate combined with another optical film or the like, if required. For example, by attaching an iodine-based or dye-based polarizing plate (or a polarizer) produced industrially to the retardation plate of the present invention via an adhesive, a pressures-sensitive adhesive, or the like, a polarizing plate with an retardation plate having a function of compensating and adjusting the birefringence of a liquid crystal display element can be obtained.

[Liquid Crystal Panel]

Figure 1:
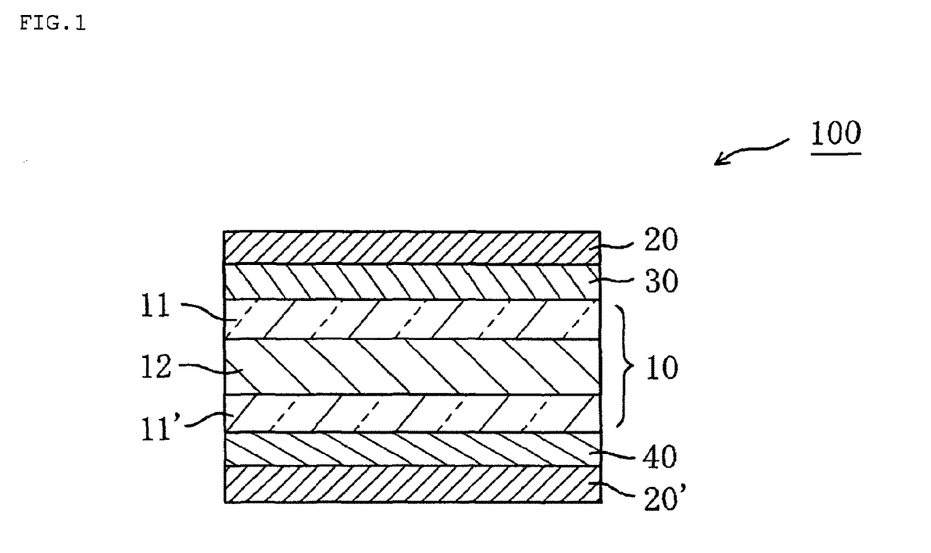
FIG. 1 is a schematic cross-sectional view of a liquid crystal panel according to a preferred embodiment of the present invention.

The liquid crystal panel of the present invention includes the retardation plate of the present invention. FIG. 1 is a schematic cross-sectional view of a liquid crystal panel according to a preferred embodiment of the present invention. The liquid crystal panel 100 includes a liquid crystal cell 10, a first polarizer 20 placed on one side (viewer side in the illustrated example) of the liquid crystal cell 10, a second polarizer 20' placed on the other side (backlight side in the illustrated example) of the liquid crystal cell 10, a retardation plate 30 placed between the first polarizer 20 and the liquid crystal cell 10, and a retardation plate 40 placed between the second polarizer 20' and the liquid crystal cell 10. At least one of the retardation plate 30 and the retardation plate 40 is the retardation plate of the present invention. If required, any suitable protective layer (not shown) can be provided on at least one side of the first polarizer 20. If required, any suitable protective layer (not shown) can be provided on at least one side of the second polarizer 20'. By providing the protective layer, the degradation of the polarizer can be prevented. It is preferred that the first polarizer 20 and the second polarizer 20' be placed so that absorption axes thereof are perpendicular to each other. Another optical compensation layer (not shown) may be provided between the liquid crystal cell 10 and the first polarizer 20. Another optical compensation layer (not shown) may be provided between the liquid crystal cell 10 and the second polarizer 20'. The kind, number, placement position, and the like of the optical compensation layer can be selected appropriately depending upon the purpose. The optical elements constituting the liquid crystal panel of the present invention, i.e., the liquid crystal cell 10, the first polarizer 20, the second polarizer 20', the retardation plate 30, the retardation plate 40, other optical compensation layers, the protective layer, and the like can be laminated via any suitable pressure-sensitive adhesive layers or adhesive layers.

The liquid crystal cell 10 includes a pair of substrates 11, 11' and a liquid crystal layer 12 as a display medium interposed between the substrates 11, 11'. On one substrate (color filter substrate) 11, a color filter and a black matrix (neither of which is shown) are provided. On the other substrate (active matrix substrate) 11', switching elements (typically TFTs) (not shown) controlling the electrooptical properties of liquid crystal, scanning lines (not shown) supplying a gate signal to the switching elements and signal lines (not shown) supplying a source signal, and pixel electrodes and counter electrodes (neither of which is shown) are provided. Note that the color filter may be provided on the active matrix substrate 11' side. The interval (cell gap) between the substrates 11, 11' is controlled with a spacer (not shown). On the sides of the substrates 11, 11' to which the liquid crystal layer 12 contacts, for example, alignment films (not shown) formed of polyimide are provided.

As the driving mode of the liquid crystal cell 10, any suitable driving mode can be adopted as long as the effects of the present invention are obtained.

Specific examples of the driving mode include a super twisted nematic (STN) mode, a twisted nematic (TN) mode, an in-plane switching (IPS) mode, a vertical aligned (VA) mode, an optically aligned birefringence (OCB) mode, a hybrid aligned nematic (HAN) mode, and an axially symmetric aligned microcell (ASM) mode.

[Liquid Crystal Display Apparatus]

Figure 2:
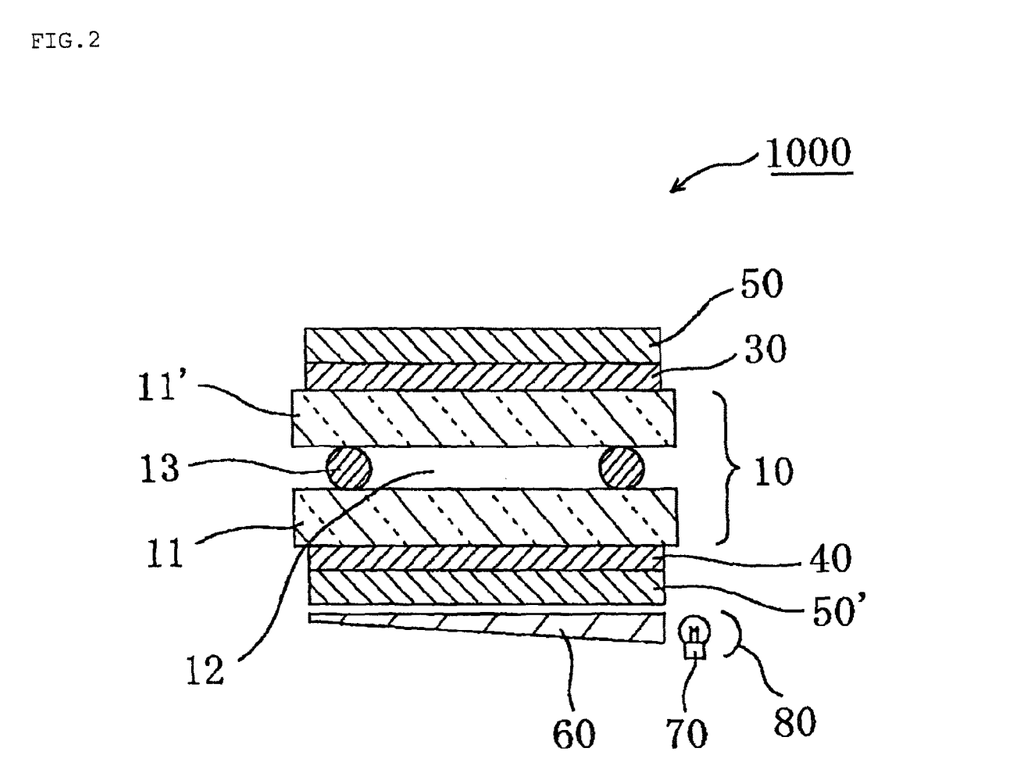
FIG. 2 is a schematic cross-sectional view of a liquid crystal display apparatus according to a preferred embodiment of the present invention.

The liquid crystal display apparatus of the present invention includes the liquid crystal panel of the present invention. FIG. 2 is a schematic cross-sectional view of a liquid crystal display apparatus according to a preferred embodiment of the present invention. In the illustrated example, although a transmission-type liquid crystal display apparatus is described, it should be appreciated that the present invention is also applied to a reflection-type liquid crystal display apparatus or the like.

In FIG. 2, a liquid crystal display apparatus 1000 includes a liquid crystal cell 10, retardation plates 30, 40 placed with the liquid crystal cell 10 interposed there between, polarizing plates 50, 50' placed on outer sides of the retardation plates 30, 40, a light guide plate 60, a light source 70, and a reflector 80. The polarizing plates 50, 50' are placed so that polarization axes thereof are perpendicular to each other. The liquid crystal cell 10 includes a pair of glass substrates 11, 11', and a liquid crystal layer 12 as a display medium placed between the substrates.

For example, in the case of a TN system, in the liquid crystal display apparatus 1000, liquid crystal molecules of the liquid crystal layer 12 are aligned in such a manner that polarization axes are shifted by 90° under no voltage application. In such a state, incident light with a light in one direction transmitted by the polarizing plate is twisted by 90° by liquid crystal molecules. As described above, since the polarizing plates are placed so that polarization axes thereof are perpendicular to each other, the light (polarized light) having reached the other polarizing plate is transmitted through the polarizing plate. Thus, under no voltage application, the liquid crystal display apparatus 1000 exhibits a white display (normally white system). On the other hand, when a voltage is applied to the liquid crystal display apparatus 1000, the alignment of the liquid crystal molecules in the liquid crystal layer 12 changes. Consequently, light (polarized light) having reached the other polarizing plate cannot be transmitted through the polarizing plate and exhibits a black display. By switching a display in such a manner for each pixel using an active element, an image is formed.

EXAMPLES

Hereinafter, the present invention will be described more specifically by way of examples. It should be noted that the present invention is not limited by these examples. In the examples and comparative examples, "part" and "%" are based on a weight. Further, the amount of a residual solvent and a retardation were measured by the following methods.

(Amount of a Residual Solvent)

In order to measure the amount of a residual solvent, a part of the obtained laminate was cut into a piece of 5 cm in all sides, and a weight X (weight immediately before stretching) of the laminate before being heated and a weight Y of the laminate after being heated at 150° C. for 30 minutes were measured, whereby the amount of a residual solvent immediately before stretching was calculated by the following expression:

Amount of a residual solvent(% by weight)=[$(X-Y)/X$]×100

(Retardation)

The retardation was obtained by measuring in-plane retardations Re(480), Re(590), and Re(750) at wavelengths of 480 nm, 590 nm, and 750 nm, respectively, using a retardation measurement apparatus (KOBRA21ADH (trade name) manufactured by Oji Scientific Instruments).

Example 1

As an optical base material, a film (amount of a residual solvent=0.3%, thickness=70 μm) formed of a norbornene-based resin having positive alignment birefringence (ARTON FLZU, Tg=128° C., manufactured by JSR Corporation) was prepared.

As a resin having negative alignment birefringence, a styrene-maleic anhydride copolymer (Tg=148° C.) was prepared. The styrene-maleic anhydride copolymer was obtained by supplying styrene (1,000 g/hr) and a styrene solution of maleic anhydride (700 g/hr, the amount of maleic anhydride=25 g/hr) successively to a 2-L stainless autoclave at 110° C. for a retention time of 1 hour, extracting the mixture at a conversion rate of 20%, and reprecipitating the mixture with methanol. The styrene-maleic anhydride copolymer was dissolved in methyl ethyl ketone to prepare an application solution of a resin concentration of 33%. The wavelength dispersion characteristics of the styrene-maleic anhydride used herein are larger than those of a norbornene-based resin.

Next, the application solution was applied to an optical base material with an applicator and heated at 80° C. for 10 minutes, whereby a laminate having an application layer (thickness=40 μm) on the optical base material layer was obtained. The amount of a residual solvent immediately before stretching of the laminate was calculated to be 7.4%. Table 1 shows Tg and thickness of a resin used for the optical base material layer and the application layer, the amount of a residual solvent immediately before stretching, the stretching temperature, and the film state after stretching.

Next, when the laminate was uniaxially stretched at a stretching temperature of 110° C. and a stretching ratio of 2.0, a retardation plate having a satisfactory outer appearance was obtained. The in-plane retardation of the obtained retardation plate was measured. As shown in Table 2, the retardation plate had Re(480)/Re(590) of 0.93 and Re(750)/Re(590) of 1.06, and exhibited so-called reverse dispersion characteristics in which a retardation increases with an increase in a wavelength. The amount of a residual solvent of the retardation plate immediately after stretching was 3.0%.

Example 2

In the same way as in Example 1, the application solution was applied to the optical base material, and heated at 80° C. for 10 minutes, further at 120° C. for 20 minutes, whereby a laminate having an application layer (thickness=40 μm) on the optical base material (thickness=70 μm) was obtained. The amount of a residual solvent immediately before stretching of the laminate was calculated to be 3.1%. Table 1 shows Tg and thickness of a resin used for the optical base material layer and the application layer, the amount of a residual solvent immediately before stretching, the stretching temperature, and the film state after stretching.

Next, when the laminate was uniaxially stretched at a stretching temperature of 120° C. and a stretching ratio of 2.0, a retardation plate having a satisfactory outer appearance was obtained. The in-plane retardation of the obtained retardation plate was measured. As shown in Table 2, the retardation plate had Re(480)/Re(590) of 0.98 and Re(750)/Re(590) of 1.03, and exhibited so-called reverse dispersion characteristics in which a retardation increases with an increase in a wavelength. The amount of a residual solvent of the retardation plate immediately after stretching was 1.5%.

Comparative Example 1

In the same way as in Example 1, the application solution was applied to the optical base material, and heated at 80° C. for 10 minutes, further at 120° C. for 20 minutes, and still further at 150° C. for 10 minutes, whereby a laminate having an application layer (thickness=40 μm) on an optical base material (thickness=70 μm) was obtained. The amount of a residual solvent immediately before stretching of the laminate was calculated to be 1.0%. Table 1 shows Tg and thickness of a resin used for the optical base material layer and the application layer, the amount of a residual solvent immediately before stretching, the stretching temperature, and the film state after stretching.

Next, when the laminate was uniaxially stretched at a stretching temperature of 140° C. and a stretching ratio of 2.0, a retardation plate having a satisfactory outer appearance was obtained. The retardation of the obtained retardation plate was measured. As shown in Table 2, the retardation plate had Re(480)/Re(590) of 1.03 and Re(750)/Re(590) of 0.96, and did not exhibit so-called reverse dispersion characteristics in which a retardation increases with an increase in a wavelength. The amount of a residual solvent of the retardation plate immediately after stretching was 0.8%.

Example 3

As an optical base material, a film (amount of a residual solvent=0.3%, thickness=70 μm) formed of a norbornene-based resin having positive alignment birefringence (ARTON FLZU, Tg=128° C., manufactured by JSR Corporation) was prepared.

As a resin having negative alignment birefringence, a styrene-maleic anhydride copolymer (Product No. 426954, Tg=132° C., manufactured by SIGMA-ALDRICH Japan K.K.) was prepared. The styrene-maleic anhydride copolymer was dissolved in methyl ethyl ketone to prepare an application solution of a resin concentration of 33%. The wavelength dispersion characteristics of the styrene-maleic anhydride used herein are larger than those of a norbornene-based resin.

Next, the application solution was applied to an optical base material with an applicator and heated at 80° C. for 10 minutes, further at 120° C. for 20 minutes, whereby a laminate having an application layer (thickness=40 μm) on the optical base material layer was obtained. The amount of a residual solvent immediately before stretching of the laminate was calculated to be 2.1%. Table 1 shows Tg and thickness of a resin used for the optical base material layer and the application layer, the amount of a residual solvent immediately before stretching, the stretching temperature, and the film state after stretching.

Next, when the laminate was uniaxially stretched at a stretching temperature of 120° C. and a stretching ratio of 2.0, a retardation plate having a satisfactory outer appearance was obtained. The in-plane retardation of the obtained retardation plate was measured. As shown in Table 2, the retardation plate had Re(480)/Re(590) of 0.95 and Re(750)/Re(590) of 1.05, and exhibited so-called reverse dispersion characteristics in which a retardation increases with an increase in a wavelength. The amount of a residual solvent of the retardation plate immediately after stretching was 0.5%.

Example 4

The same optical base material and application solution as those in Example 3 were prepared.

Next, the application solution was applied to the optical base material with an applicator, and heated at 80° C. for 10 minutes, whereby a laminate having an application layer (thickness=40 μm) on an optical base material layer was obtained. The amount of a residual solvent immediately before stretching of the laminate was calculated to be 6.7%. Table 1 shows Tg and thickness of a resin used for the optical base material layer and the application layer, the amount of a residual solvent immediately before stretching, the stretching temperature, and the film state after stretching.

Next, when the laminate was uniaxially stretched at a stretching temperature of 95° C. and a stretching ratio of 2.0, a retardation plate having a satisfactory outer appearance was obtained. The in-plane retardation of the obtained retardation plate was measured. As shown in Table 2, the retardation plate had Re(480)/Re(590) of 0.94 and Re(750)/Re(590) of 1.06, and exhibited so-called reverse dispersion characteristics in which a retardation increases with an increase in a wavelength. The amount of a residual solvent of the retardation plate immediately after stretching was 2.7%.

Example 5

As an optical base material, a film (amount of a residual solvent=0.5%, thickness=130 μm) formed of a norbornene-based resin having positive alignment birefringence (ARTON FLZU, Tg=128° C., manufactured by JSR Corporation) was prepared.

As a resin having negative alignment birefringence, a styrene-maleic anhydride copolymer (Product No. 426954, Tg=132° C., manufactured by SIGMA-ALDRICH Japan K.K.) was prepared. The styrene-maleic anhydride copolymer was dissolved in methyl ethyl ketone to prepare an application solution of a resin concentration of 33%. The wavelength dispersion characteristics of the styrene-maleic anhydride used herein are larger than those of a norbornene-based resin.

Next, the application solution was applied to an optical base material with an applicator and heated at 80° C. for 10 minutes, further at 120° C. for 20 minutes, whereby a laminate having an application layer (thickness=60 μm) on the optical base material layer was obtained. The amount of a residual solvent immediately before stretching of the laminate was calculated to be 3.3%. Table 1 shows Tg and thickness of a resin used for the optical base material layer and the application layer, the amount of a residual solvent immediately before stretching, the stretching temperature, and the film state after stretching.

Next, when the laminate was uniaxially stretched at a stretching temperature of 120° C. and a stretching ratio of 2.0, a retardation plate having a satisfactory outer appearance was obtained. The in-plane retardation of the obtained retardation plate was measured. As shown in Table 2, the retardation plate had Re(480)/Re(590) of 0.96 and Re(750)/Re(590) of 1.04, and exhibited so-called reverse dispersion characteristics in which a retardation increases with an increase in a wavelength. The amount of a residual solvent of the retardation plate immediately after stretching was 0.7%.

Example 6

The same optical base material and application solution as those in Example 5 were prepared.

Next, the application solution was applied to the optical base material with an applicator, and heated at 80° C. for 20 minutes, whereby a laminate having an application layer (thickness=60 μm) on an optical base material layer was obtained. The amount of a residual solvent immediately before stretching of the laminate was calculated to be 7.6%. Table 1 shows Tg and thickness of a resin used for the optical base material layer and the application layer, the amount of a residual solvent immediately before stretching, the stretching temperature, and the film state after stretching.

Next, when the laminate was uniaxially stretched at a stretching temperature of 120° C. and a stretching ratio of 2.0, a retardation plate having a satisfactory outer appearance was obtained. The in-plane retardation of the obtained retardation plate was measured. As shown in Table 2, the retardation plate had Re(480)/Re(590) of 0.96 and Re(750)/Re(590) of 1.03, and exhibited so-called reverse dispersion characteristics in which a retardation increases with an increase in a wavelength. The amount of a residual solvent of the retardation plate immediately after stretching was 2.3%.

Example 7

The same optical base material and application solution as those in Example 5 were prepared.

Next, the application solution was applied to the optical base material with an applicator, and heated at 80° C. for 10 minutes, whereby a laminate having an application layer (thickness=60 μm) on an optical base material layer was obtained. The amount of a residual solvent immediately before stretching of the laminate was calculated to be 10.0%. Table 1 shows Tg and thickness of a resin used for the optical base material layer and the application layer, the amount of a residual solvent immediately before stretching, the stretching temperature, and the film state after stretching.

Next, when the laminate was uniaxially stretched at a stretching temperature of 120° C. and a stretching ratio of 2.0, a retardation plate having a satisfactory outer appearance was obtained, but some bubbles were formed. The in-plane retardation of the obtained retardation plate was measured. As shown in Table 2, the retardation plate had Re(480)/Re(590) of 0.97 and Re(750)/Re(590) of 1.02, and exhibited so-called reverse dispersion characteristics in which a retardation increases with an increase in a wavelength. The amount of a residual solvent of the retardation plate immediately after stretching was 2.2%.

Comparative Example 2

The same optical base material and application solution as those in Example 5 were prepared.

Next, the application solution was applied to the optical base material with an applicator, and left standing at room temperature, whereby a laminate having an application layer (thickness=60 μm) on an optical base material layer was obtained. The amount of a residual solvent immediately before stretching of the laminate was calculated to be 16.0%. Table 1 shows Tg and thickness of a resin used for the optical base material layer and the application layer, the amount of a residual solvent immediately before stretching, the stretching temperature, and the film state after stretching.

Next, when the laminate was uniaxially stretched at a stretching temperature of 120° C. and a stretching ratio of 2.0, wrinkles were formed in the laminate due to heat, which made it impossible to stretch the laminate.

Comparative Example 3

As an optical base material, a film (a mount of a residual solvent=0.3%, thickness=70 μm) formed of a norbornene-based resin having positive alignment birefringence (ARTON FLZU, Tg=128° C., manufactured by JSR Corporation) was prepared. An application layer was not provided on the optical base material.

Next, when the film was uniaxially stretched at a stretching temperature of 120° C. and a stretching ratio of 2.0, a retardation plate having a satisfactory outer appearance was obtained. The in-plane retardation of the obtained retardation plate was measured. As shown in Table 2, the retardation plate had Re(480)/Re(590) of 1.00 and Re(750)/Re(590) of 0.99, and did not exhibit so-called reverse dispersion characteristics in which a retardation increases with an increase in a wavelength. The amount of a residual solvent of the retardation plate immediately after stretching was 0.3%.

Comparative Example 4

As an optical base material, a film (amount of a residual solvent=0.3%, thickness=60 μm) formed of a styrene-maleic anhydride copolymer having negative alignment birefringence (Product No. 426954, Tg=132° C., manufactured by SIGMA-ALDRICH Japan K.K.) was prepared. An application layer was not provided on the optical base material.

Next, when the film was uniaxially stretched at a stretching temperature of 135° C. and a stretching ratio of 2.0, a retardation plate having a satisfactory outer appearance was obtained. The in-plane retardation of the obtained retardation plate was measured. As shown in Table 2, the retardation plate had Re(480)/Re(590) of 1.03 and Re(750)/Re(590) of 0.96, and did not exhibit so-called reverse dispersion characteristics in which a retardation increases with an increase in a wavelength. The amount of a residual solvent of the retardation plate immediately after stretching was 0.3%.

Comparative Example 5

As an optical base material, a film (amount of a residual solvent=0.5%, thickness=130 μm) formed of a norbornene-based resin having positive alignment birefringence (ARTON FLZU, Tg=128° C., manufactured by JSR Corporation) was prepared. An application layer was not provided on the optical base material.

Next, when the film was uniaxially stretched at a stretching temperature of 140° C. and a stretching ratio of 2.0, a retardation plate having a satisfactory outer appearance was obtained. The in-plane retardation of the obtained retardation plate was measured. As shown in Table 2, the retardation plate had Re(480)/Re(590) of 1.00 and Re(750)/Re(590) of 0.99, and did not exhibit so-called reverse dispersion characteristics in which a retardation increases with an increase in a wavelength. The amount of a residual solvent of the retardation plate immediately after stretching was 0.5%.

Comparative Example 6

As an optical base material, a film (amount of a residual solvent=0.3%, thickness=70 μm) formed of a norbornene-based resin having positive alignment birefringence (ARTON FLZU, Tg=128° C., manufactured by JSR Corporation) was prepared.

As a resin having negative alignment birefringence, a polystyrene resin (G899, Tg=102° C., manufactured by JAPAN POLYSTYRENE INC.) was prepared. The polystyrene resin was dissolved in methyl ethyl ketone to prepare an application solution of a resin concentration of 33%. The wavelength dispersion characteristics of the polystyrene resin used herein are larger than those of a norbornene-based resin.

Next, the application solution was applied to an optical base material with an applicator and heated at 80° C. for 10 minutes, further at 120° C. for 20 minutes, whereby a laminate having an application layer (thickness=40 μm) on the optical base material layer was obtained. The amount of a residual solvent immediately before stretching of the laminate was calculated to be 0.5%. Table 1 shows Tg and thickness of a resin used for the optical base material layer and the application layer, the amount of a residual solvent immediately before stretching, the stretching temperature, and the film state after stretching.

Next, when the laminate was uniaxially stretched at a stretching temperature of 110° C. and a stretching ratio of 2.0, a retardation plate having a satisfactory outer appearance was obtained. The in-plane retardation of the obtained retardation plate was measured. As shown in Table 2, the retardation plate had Re(480)/Re(590) of 1.00 and Re(750)/Re(590) of 0.99, and exhibited flat dispersion characteristics without exhibiting so-called reverse dispersion characteristics in which a retardation increases with an increase in a wavelength. The amount of a residual solvent of the retardation plate immediately after stretching was 0.5%.

TABLE 1

|  | Optical base material | | Application layer | | Amount of residual solvent immediately before stretching (%) | Stretching temperature (° C.) | Film state after stretching*[1] |
| --- | --- | --- | --- | --- | --- | --- | --- |
|  | Tg (° C.) | Thickness (μm) | Tg (° C.) | Thickness (μm) | | | |
| Example 1 | 128 | 70 | 148 | 40 | 7.4 | 110 | ○ |
| Example 2 | 128 | 70 | 148 | 40 | 3.1 | 120 | ○ |
| Comparative | 128 | 70 | 148 | 40 | 1.0 | 140 | ○ |

TABLE 1-continued

| | Optical base material | | Application layer | | Amount of residual solvent immediately | Stretching | Film state |
|---|---|---|---|---|---|---|---|
| | Tg (°C.) | Thickness (μm) | Tg (°C.) | Thickness (μm) | before stretching (%) | temperature (°C.) | after stretching*[1] |
| Example 1 | | | | | | | |
| Example 3 | 128 | 70 | 132 | 40 | 2.1 | 120 | ○ |
| Example 4 | 128 | 70 | 132 | 40 | 6.7 | 95 | ○ |
| Example 5 | 128 | 130 | 132 | 60 | 3.3 | 120 | ○ |
| Example 6 | 128 | 130 | 132 | 60 | 7.6 | 120 | ○ |
| Example 7 | 128 | 130 | 132 | 60 | 10.0 | 120 | Δ |
| Comparative Example 2 | 128 | 130 | 132 | 60 | 16.0 | Not stretchable | x |
| Comparative Example 3 | 128 | 70 | — | — | 0.3 | 120 | ○ |
| Comparative Example 4 | 132 | 60 | — | — | 0.3 | 135 | ○ |
| Comparative Example 5 | 128 | 130 | — | — | 0.5 | 140 | ○ |
| Comparative Example 6 | 128 | 70 | 102 | 40 | 0.5 | 110 | ○ |

*[1] ○: satisfactory outer appearance Δ: a few bubbles x: unsatisfactory outer appearance (formation of wrinkles, etc.)

TABLE 2

| | R(480)/R(590) | R(750)/R(590) | Reverse dispersion characteristics |
|---|---|---|---|
| Example 1 | 0.93 | 1.06 | ○ |
| Example 2 | 0.98 | 1.03 | ○ |
| Comparative Example 1 | 1.03 | 0.96 | x |
| Example 3 | 0.95 | 1.05 | ○ |
| Example 4 | 0.94 | 1.06 | ○ |
| Example 5 | 0.96 | 1.04 | ○ |
| Example 6 | 0.96 | 1.03 | ○ |
| Example 7 | 0.97 | 1.02 | ○ |
| Comparative Example 2 | Not measured due to the impossibility of stretching | | |
| Comparative Example 3 | 1.00 | 0.99 | x |
| Comparative Example 4 | 1.03 | 0.96 | x |
| Comparative Example 5 | 1.00 | 0.99 | x |
| Comparative Example 6 | 1.00 | 0.99 | x |

INDUSTRIAL APPLICABILITY

The retardation plate of the present invention can be used preferably for various liquid crystal display apparatuses such as a personal computer and a liquid crystal television.

The invention claimed is:

1. A method of producing a retardation plate, comprising the steps of:
   providing an optical base material containing a resin A;
   applying a solution containing a resin B and a solvent onto the optical base material to obtain a laminate including the optical base material layer and an application layer;
   setting an amount of a residual solvent in the laminate to be 2 to 10% by weight; and
   stretching the laminate after setting the amount of the residual solvent,
   wherein one of the resin A and the resin B has positive alignment birefringence, and another one of the resin A and the resin B has negative alignment birefringence, and
   wherein the optical base material before the stretching contains a residual solvent in an amount of 0.5% by weight or less.

2. A production method according to claim 1, wherein a glass transition temperature Tg(B) of the resin B is higher than a glass transition temperature Tg(A) of the resin A.

3. A production method according to claim 1, wherein a stretching temperature of the laminate is lower than the glass transition temperature Tg(A) of the resin A.

4. A production method according to claim 1, wherein the resin having positive alignment birefringence is a norbornene-based resin.

5. A production method according to claim 1, wherein the resin having negative alignment birefringence is a styrene-maleic anhydride copolymer.

6. A production method according to claim 2, wherein a stretching temperature of the laminate is lower than the glass transition temperature Tg(A) of the resin A.

7. A production method according to claim 2, wherein the resin having positive alignment birefringence is a norbornene-based resin.

8. A production method according to claim 3, wherein the resin having positive alignment birefringence is a norbornene-based resin.

9. A production method according to claim 2, wherein the resin having negative alignment birefringence is a styrene-maleic anhydride copolymer.

10. A production method according to claim 3, wherein the resin having negative alignment birefringence is a styrene-maleic anhydride copolymer.

11. A production method according to claim 4, wherein the resin having negative alignment birefringence is a styrene-maleic anhydride copolymer.

* * * * *